US008507151B2

(12) United States Patent
Budinski

(10) Patent No.: US 8,507,151 B2
(45) Date of Patent: Aug. 13, 2013

(54) MEMBRANE ELECTRODE ASSEMBLY HAVING LOW SURFACE IONOMER CONCENTRATION

(75) Inventor: Michael K. Budinski, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1224 days.

(21) Appl. No.: 12/015,929

(22) Filed: Jan. 17, 2008

(65) Prior Publication Data

US 2009/0186251 A1  Jul. 23, 2009

(51) Int. Cl.
*H01M 4/02* (2006.01)
*H01M 4/36* (2006.01)
*H01M 8/00* (2006.01)

(52) U.S. Cl.
USPC .............. 429/523; 429/529; 429/535

(58) Field of Classification Search
None
See application file for complete search history.

(56) References Cited

U.S. PATENT DOCUMENTS

| | | | |
|---|---|---|---|
| 5,272,017 A | 12/1993 | Swathirajan et al. | |
| 6,524,736 B1 * | 2/2003 | Sompalli et al. | 429/42 |
| 6,524,738 B1 | 2/2003 | Lee et al. | |
| 6,669,801 B2 * | 12/2003 | Yoshimura et al. | 156/230 |
| 6,861,173 B2 | 3/2005 | Bhaskar et al. | |
| 7,098,163 B2 | 8/2006 | Hampden-Smith et al. | |
| 2006/0204831 A1 * | 9/2006 | Yan et al. | 429/42 |

OTHER PUBLICATIONS

Campo et al, Physical and electrochemical evaluation of commercial carbon black as electrocatalysts supports for DMFC applications, Journal of Power Sources 173 (2007), pp. 860-866.*
Indian Office Action dated Jan. 20, 2012; Application SN: 66/KOL/2009; Applicant: GM Global Technology Operations LLC.; 1 page.

* cited by examiner

*Primary Examiner* — Emily Le
*Assistant Examiner* — Michael Forrest
(74) *Attorney, Agent, or Firm* — BrooksGroup

(57) ABSTRACT

A membrane electrode assembly (MEA) comprises a polymer electrolyte membrane having at least one electrode layer on each of the opposing sides of the membrane. The electrode layer comprises a catalyst, an electrically conductive particulate material and an ionomer binder. The ionomer binder concentration on the exterior surface of the MEA is lower than the ionomer binder concentration near the electrode membrane interface. The electrode layer is formed by casting and drying a solvent ink layer between a nonporous release surface and a porous releasable decal.

13 Claims, 2 Drawing Sheets

MEMBRANE ELECTRODE ASSEMBLY HAVING LOW SURFACE IONOMER CONCENTRATION

TECHNICAL FIELD

The field to which the disclosure generally relates includes electrochemical fuel cells and membrane electrode assemblies (MEA) used in fuel cells.

BACKGROUND

Fuel cells are efficient energy devices that electrochemically derive electricity from fuel gases such as hydrogen and methanol with almost no harmful emission. There are challenges, however, faced by the industries that are trying to commercially adopt such devices. Some of the challenges include simple and economical method of manufacturing fuel cells with high energy density and reliability. Polymer electrolyte membrane fuel cells are one of the most promising fuel cell types that can potentially meet the commercial challenges. Polymer electrolyte membrane fuel cells are typically made of a stack of multiple membrane electrode assemblies (MEA) separated by bipolar plates and gas flow channels. Each of the membrane electrode assemblies is made of an anode, a cathode, and a polymer electrolyte membrane sandwiched between the anode and cathode. The anode and cathode of a MEA typically comprise a catalyst and an electric conductor held together by a binder and/or an ionomer electrolyte. Conventional electrode construction methods inherently result in an excess amount of ionomer on the electrode surface that impedes gas diffusion to the catalyst in the electrode layer for electrochemical reaction. Due to its gas diffusion rate limitation, the extra amount of ionomer on the electrode surface causes significant reduction of the voltage output of a fuel cell, especially at high current density. Alternative methods of electrode construction to alleviate such problems may require additional steps and additional cost. Therefore, there is a need for a simple and inexpensive method of constructing a membrane electrode assembly and a fuel cell with low ionomer concentration on the electrode surface.

SUMMARY OF EXEMPLARY EMBODIMENTS OF THE INVENTION

In one embodiment, a membrane electrode assembly (MEA) for fuel cells comprises a polymer electrolyte membrane having at least one electrode layer on each of the two opposing sides of the membrane. The electrode layer comprises a catalyst, an electrically conductive particulate material and an ionomer binder. The ionomer binder concentration on the exterior surface of the MEA is lower than the ionomer binder concentration near the electrode/membrane interface. The electrode layer may be formed by casting and drying a solvent ink layer between a nonporous release surface and a porous releasable decal.

Another embodiment of the invention includes a method of making a membrane electrode assembly comprising casting onto a nonporous release surface a solvent ink layer comprising a volatile solvent, a catalyst, an electrically conductive particulate material, and an ionomer binder; disposing a porous releasable decal over the solvent ink layer; drying to remove the volatile solvent from the solvent ink layer to form an electrode layer; peeling off the electrode layer and the decal together from the nonporous release surface; providing a polymer electrolyte membrane having two sides; pressing the electrode layer and the decal together against each of the two sides of the membrane with the electrode layer in intimate contact with the membrane; causing the electrode layer to bond securely onto the membrane; and removing the releasable decal from the electrode layer.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
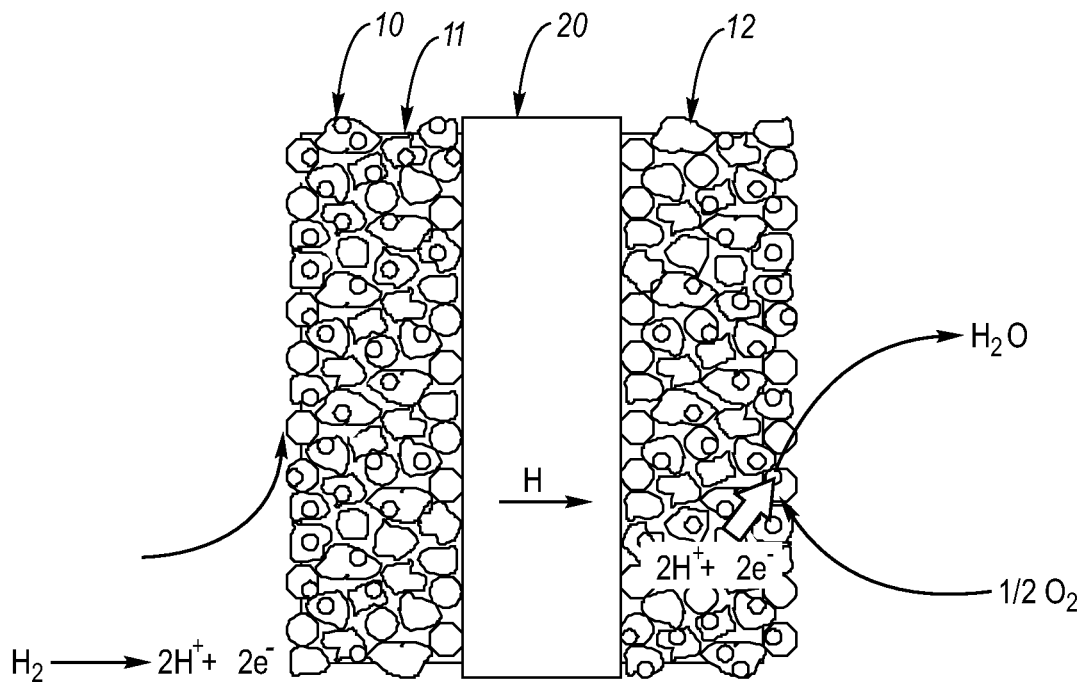
FIG. 1 is a schematic drawing of a cross-sectional view of a MEA according to one embodiment of the present invention.

The cross-sectional view of an MEA according to one embodiment of the present invention is shown in FIG. 1. A polymer electrolyte membrane 20 is sandwiched between two electrode layers. The electrode layer on the left of the polymer electrolyte membrane 20 represents an anode where a fuel gas, hydrogen, is electrochemically oxidized into proton ions by surrendering two electrons. The proton ions are transported through the polymer electrolyte membrane 20 to the cathode, the electrode layer on the right side of the membrane. Oxygen (or air) diffuses into the cathode layer to combine with proton ions through an electrochemical reduction reaction that generates product water. The water generated on the cathode is typically carried away by the gas flow over the cathode surface. Electricity is generated in the electrochemical processes where electrons are produced on the anode and consumed on the cathode.

The polymer electrolyte membrane 20 is an ion exchange resin membrane. The resins include ionic groups in their polymeric structure; one ionic component of which is fixed or retained by the polymeric matrix and at least one other ionic component is a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cation exchange, proton conductive resins is the so-called sulfonated polymer cation exchange resins. In the sulfonated polymer membranes, the cation ion exchange groups are hydrated sulfonic acid radicals which are covalently attached to the polymer backbone.

The formation of these ion exchange resins into membranes or sheets is well known in the art. The preferred type is a sulfonated fluoropolymer electrolyte in which the entire membrane structure has ion exchange characteristics and the polymer has a fluorinated backbone structure. These membranes are commercially available, and a typical example of a commercial sulfonated fluorinated, proton conductive membrane is sold by E.I. Dupont de Nemours & Co. under the trade designation NAFION. Another such sulfonated fluorinated ion exchange resin is sold by Dow Chemical.

The anode and cathode electrode layers in the MEA may be different or the same in their compositions and thickness. Each of the electrode layers generally comprises a catalyst 10, an electrically conductive particulate material 12 and an ionomer binder 11, as illustrated schematically in FIG. 1. The ionomer binder provides an ion exchange function similar to the function provided by the polymer electrolyte membrane 20. The ionomer binder also binds the catalyst and the electrically conductive particulate materials together and provides strong bonding between the electrode layer and the polymer electrolyte membrane 20. The catalyst for the anode is capable of catalyzing the electrochemical oxidation of fuel gases such as hydrogen, carbon monoxide and methanol. The catalyst for the cathode is capable of catalyzing the electrochemical reduction of oxidant gases such as oxygen. The electrically conductive particulate material provides electric conductivity for the electrode layer. It may also function as a catalyst support.

The catalysts used in the anode and cathode layers may be the same or different. The catalyst is preferably a supported metal catalyst comprised of platinum or a platinum alloy on carbon. The carbon support preferably has a specific surface area of from 50 to 2000 $m^2$/gram BET surface area. Within this range, the metal catalyst is supported on the carbon support with good dispersibility and stability, exhibiting a superior activity in the electrochemical reactions for a long time. In one embodiment, platinum is used because it is highly active with respect to the hydrogen oxidation reaction at the anode and the oxygen reduction reaction at the cathode in such a MEA fuel cell. A platinum alloy may also be used to impart the electrode catalyst with further stability and activity.

The aforementioned platinum alloy is preferably an alloy comprising platinum and one or more metals selected from the group consisting of platinum group metals other than platinum (ruthenium, rhodium, palladium, osmium, iridium), gold, silver, chrome, iron, titanium, manganese, cobalt, nickel, molybdenum, tungsten, aluminum, silicon, zinc and tin, and may contain an intermetallic compound of platinum and a metal alloyed with platinum. Particularly in the case where the anode is supplied with a gas containing carbon monoxide, the use of an alloy comprising platinum and ruthenium in the anode is preferable because the activity of the catalyst is stabilized.

The electrically conductive particulate material 12 may comprise any inert conductive materials with relatively high surface area. In one embodiment, a particulate carbon having a BET surface area of about 50 to about 2000 $m^2$/gram is used. The particulate carbon may have a particle size in the range of about 0.002-100 microns. In another embodiment, carbon particulate materials having a particle size of 0.02-1 micron and a BET surface area of 100-1000 $m^2$/gram are used. Non-limiting examples of particulate carbons include Vulcan XC-72R (available from Cabot Corporation), Ketjen black (available from Noury Chemical Corporation), carbon nanotube and acetylene black.

The ionomer binder 11 can be selected from any ion exchange materials capable of binding particulate materials and possessing sufficient ion exchange capacity to sustain the electrochemical reactions on and within the electrode layers. In an illustrative embodiment, the ionomer binder 11 is a polymer resin having ion exchange moieties such as carboxylate or sulfonate group in the molecular structure of the polymer. In another embodiment, the ionomer binder 11 is an ion exchange resin similar to what is used in polymer electrolyte membrane 20 as described above. The ionomer binder 11 may comprise a mixture of an ion exchange resin and a binder resin to provide the desired binding and ion exchange properties. The ionomer binder 11 may be soluble or dispersible in a volatile solvent such as water and organic solvents. The ionomer binder 11 may be softened to exhibit viscous adhesive characteristic at elevated temperatures to facilitate good bonding to the polymer electrolyte membrane 20 in a hot press lamination process. Non-limiting examples of ionomer binder include sulfonated fluoropolymers in solutions such as Nafion Solution (available from Solution Technologies), and its mixture with a polytetrafluoroethylene dispersion.

The ion-exchange capacity of the polymer electrolyte membrane 20 and that of the ionomer binder resin contained in the electrode layers are each preferably from 0.5 to 4.0 milliequivalent(meq)/gram dry resin, particularly preferably from 0.7 to 2.0 meq/gram dry resin.

A solvent ink may be used to make the anode and the cathode electrode layers. The ink comprises a volatile solvent, a catalyst, an electrically conductive particulate material and an ionomer binder. Each of the catalyst, electrically conductive particulate material and ionomer binder is fully described above. A single volatile solvent or a solvent mixture may be used to produce the ink, namely, a solution or a slurry comprising a catalyst, an electrically conductive particulate material and an ionomer binder. Other optional components such as humectants, water repellents, surfactants, polymer additives, and other stabilization agents may also be included in the ink.

Suitable volatile solvents include, but are not limited to, alcohols, water, and fluorine-containing solvents. Alcohols may include short chain alcohols such as methyl alcohol, ethyl alcohol, n-propyl alcohol, isopropyl alcohol, tert-butyl alcohol and the like. Mixing an alcohol with water makes it possible to enhance the solubility of an ionomer binder resin. Fluorine-containing solvents may include i) hydrofluorocarbons such as 2H-perfluoropropane, 1H,4H-perfluorobutane, 2H,3H-perfluoropentane, 3H,4H-perfluoro(2-methylpentane), 2H,5H-perfluorohexane, and 3H-perfluoro(2-methylpentane); ii) fluorocarbons such as perfluoro(1,2-dimethylcyclobutane), perfluorooctane, perfluoroheptane, and perfluorohexane; iii) hydrochlorofluorocarbons such as 1,1-dichloro-1-fluoroethane, 1,1,1-trifluoro-2,2-dichloroethane, 3,3-dichloro-1,1,1,2,2-pentafluoropropane, and 1,3-dichloro-1,1,2,2,3-pentafluoropropane; iv) fluoroethers such as 1H,4H,4H-perfluoro(3-oxapentane) and 3-methoxy-1,1,1,2,3,3-hexafluoropropane; and v) fluorine-contained alcohols such as 2,2,2-trifluoroethanol, 2,2,3,3,3-pentafluoro-1-propanol, and 1,1,1,3,3,3-hexafluoro-2-propanol.

In the case where the ink contains a fluorine-free ion exchange resin, N,N-dimethylformamide (DMF), dimethyl sulfoxide (DMSO), methylene chloride, chloroform, carbon tetrachloride, 1,1,1-trichloroethane, 1,1,2-trichloroethane, trichloroethylene, and tetrachloroethylene may also be used.

The solvent ink may contain about 0.1%-10% by weight ionomer binder, about 0.1%-60% by weight electrically conductive particulate material, and 0.001%-12% by weight catalyst. The total solid content of the ink may range from 0.2% to about 60% by weight. The ink can be made by simple mechanical mixing, high speed shear mixing, milling, or ultrasonication of the ink components. Any other ink making methods known to one of ordinary skill in the art may also be used.

Figure 2:
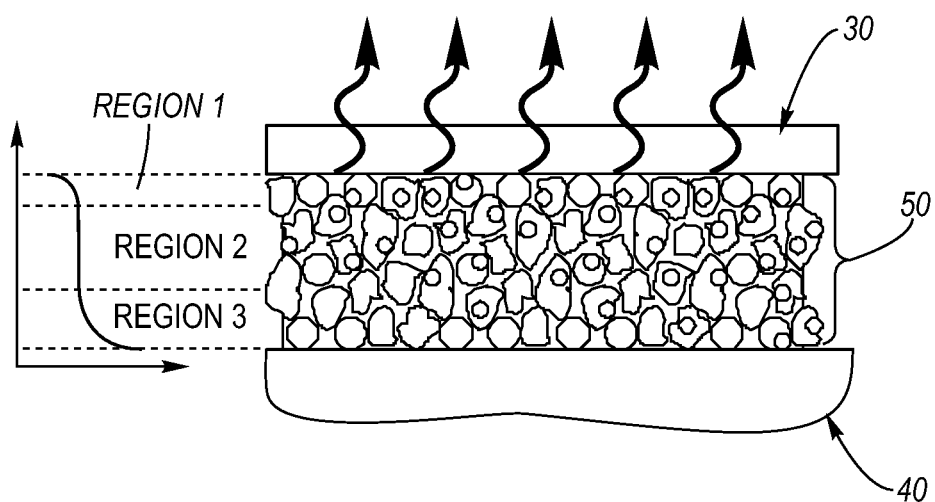
FIG. 2 is a schematic graph of an electrode layer formed between a non-porous release surface and a porous releasable decal with the concentration profile of the ionomer binder across the thickness dimension of the electrode layer also being shown in the schematic drawing.

In one embodiment, the solvent ink is cast onto a non-porous release surface as a thin ink layer. A porous releasable decal is placed over the ink layer before the ink dries. A schematic drawing of the cross-sectional view of such an ink layer is shown in FIG. 2. An ink layer 50 is formed in this manner between a non-porous release surface 40 and a porous releasable decal 30. As shown in FIG. 2, the volatile solvent in the ink layer evaporates substantially through the pores of the releasable decal 30. An electrode layer is thus formed when the solvent is substantially removed from the ink. As a result of the drying configuration, the concentration of the ionomer binder exhibits a unique pattern in the three distinct regions across the thickness dimension of the electrode layer, as shown schematically in FIG. 2 on the left of the electrode layer. The concentration of the ionomer binder is the lowest in Region 1, the surface region near the porous releasable decal. In Region 2, the middle region across the thickness dimension of the ink layer, the ionomer binder concentration is relatively constant but higher than the concentration in Region 1. The ionomer binder concentration in Region 3 near the non-porous release surface is the highest. Such ionomer concentration pattern is particularly desirable in a fuel cell MEA. The low ionomer concentration in the surface region (i.e., Region 1) allows fast diffusion and mass transport of both fuel gas and oxidant gas into the electrode layer for electrochemical reactions, while the high ionomer binder concentration in Region 3 provides strong bonding to the polymer electrolyte membrane 20 to form a durable MEA. Additionally, such low concentration profile of ionomer binder on the electrode surface facilitates humidity control in the electrode layers to insure proper moisture content for sufficient ionic conductivity and to avoid too much water buildup on the electrode layer that causes "flooding." This feature may be especially desirable when a fuel cell is operating at a high current density where fast rates of gas transport and electrochemical reactions are required. Water, as a product of the electrochemical reaction, is also generated at a fast rate in the cathode layer. The ionomer binder concentration profile provided by the configuration described above can greatly improve the water removal and humidity control. Finally, the porous nature of the releasable decal creates an inherent micro-scale surface texture on the surface of the electrode layer that further facilitates desirable fast mass transport characteristics.

There is no particular limitation on the process of casting the thin ink layer. Non-limiting examples of specific processes include batch processes such as a bar coater process, spray coating process, draw-down rod coating process, a spin coating process, a screen printing process, slot die coating, and continuous knife or roll coating processes. The drying or solvent removal from the ink layer can be accelerated by heating, vacuum drying or combination thereof.

The non-porous release surface typically exhibits a smooth surface texture, and is relatively impermeable to the solvent used in the ink. The non-porous release surface may include, but is not limited to, polished hard chromium surfaces, chromium complexes, silicone or other silioxane coated surfaces, wax coated surfaces, boron nitride surfaces, graphitic surfaces, fluoropolymer coated surfaces, olefin surfaces, zinc stearate coated surfaces, and talc coated surfaces. Other non-porous release surfaces known to one of ordinary skill in the art may also be used. Any suitable material may be used for the non-porous release surface as long as the ink formulation of interest can release off of it without damaging the cast electrode layer.

The porous releasable decal 30 provides the desirable control over the drying process of the ink layer in addition to a micro-scale surface texture. The decal is highly permeable to the volatile solvent(s) used in the ink. It also has micro-scale pores and/or channels across the structure. The decal may be flexible but dimensionally stable and strong. A thin film decal may be used. One non-limiting example of a porous releasable decal 30 is an expanded polytetrafluoroethylene membrane, commercially available from W.L. Gore & Associates, Inc. The porous release decal may have a permeability characterized by an air flow rate of 10 to 50,000 milliliter per minute per $mm^2$ at a pressure drop of 70 millibar across the decal. In one embodiment, an expanded polytetrafluoroethylene membrane with an air flow rate of 1000 to 20,000 milliliter per minute per $mm^2$ is used. Other porous polyolefins or polyamides may also be used as long as they have good solvent vapor permeation and can be released off the electrode. In various embodiments, any suitable porous polymer, porous metal, other porous film, or diffusion media may be used as long as it enables electrode solvent evaporation, absorbs some of the excess ionomer, and is releasable. There are solvent systems that optimize surface energy and viscosity such that imbibition of ionomer into the porous decal is controlled (e.g. Concus-Finn condition).

Figure 3:
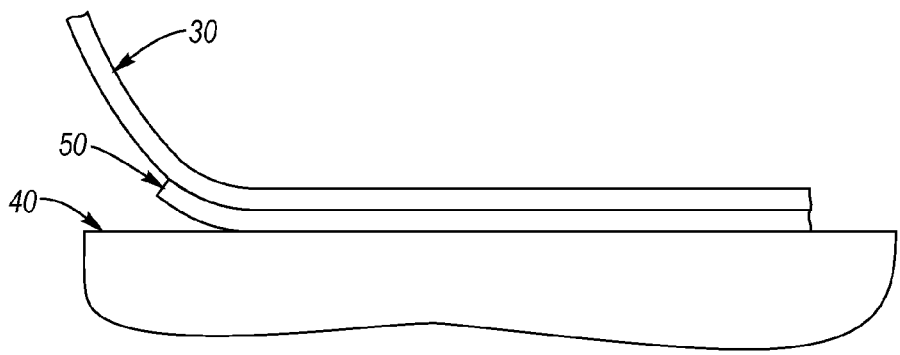
FIG. 3 is a schematic drawing of a porous releasable decal and an electrode layer being peeled off together from a non-porous release surface.

Once the ink layer 50 is dried between the non-porous release surface 40 and the porous releasable decal 30, the resulting electrode layer 50 and the porous releasable decal 30 are peeled off together as one piece from the non-porous release surface 40, as shown schematically in FIG. 3. Due to its flexibility and micro-scale texture, the porous releasable decal 30 typically adheres to the electrode layer slightly stronger than the non-porous release surface 40 does.

Figure 4:
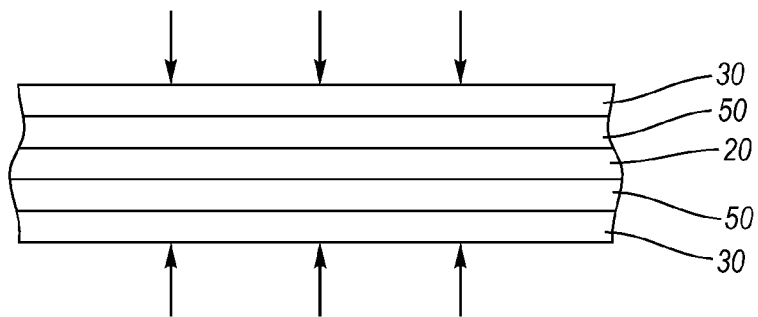
FIG. 4 is a schematic drawing of two sets of combined porous releasable decal and electrode layer being pressed on both sides of a polymer electrolyte membrane.

To form a MEA, the electrode layer 50 and porous releasable decal 30 together are placed over a polymer electrolyte membrane 20 with the electrode layer 50 being in intimate contact with the membrane surface. Referring now to FIG. 4, the polymer electrolyte membrane is sandwiched between two sets of combined electrode layer 50 and porous releasable decal 30. The sandwich structure is pressed, preferably and optionally at elevated temperatures (e.g., 50° C.-300° C.) to allow sufficient bonding between the electrode layer 50 and the polymer electrolyte membrane 20. As mentioned before, the electrode layers on both sides of the polymer electrolyte membrane 20 may be the same or different in terms of their composition and thickness. One of the electrode layers functions as the anode and the other as the cathode. The anode and cathode layers may be prepared individually using the same or different ink formulations and may be cast in different thicknesses.

Figure 5:
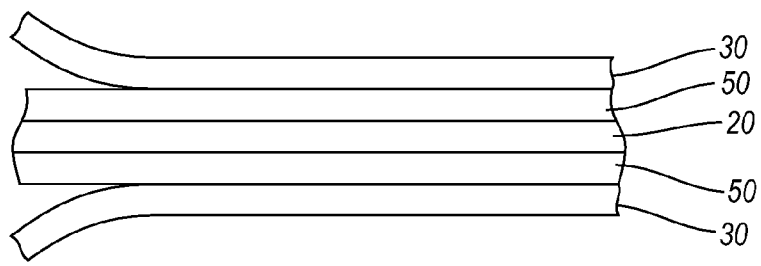
FIG. 5 is a schematic drawing of two porous releasable decal layers being peeled off from the electrode layers to form a MEA.

After being pressed together with the electrode layer 50 onto the polymer electrolyte membrane 20, the porous releasable decal 30 is then carefully peeled off from the electrode layer 50 as schematically shown in FIG. 5. If the pressing process is conducted at elevated temperatures, the pressed laminate is usually allowed to cool down to ambient temperature before the releasable decals are peeled off. After the releasable decals are peeled off, a unitary MEA is obtained.

Fuel cells can be made by stacking multiple MEA's prepared in accordance with the present invention with bipolar plates having gas flow channels in an alternating manner. Any configurations and methods known to one of ordinary skill in the art can be used to construct fuel cells using the MEA described above. One illustrative example for constructing a fuel cell from a MEA can be found in a commonly owned U.S. Pat. No. 5,272,017.

Fuel cells made from the MEA described in the present invention have many different practical uses. The fuel cells are particularly suitable as energy devices for power tools, vehicle engines, electric power plants, emergency electricity supply, portable electronics and the like. Purified hydrogen and air may be used as the fuel gas and oxidant gas, respectively, in the fuel cell.

The above description of embodiments of the invention is merely exemplary in nature and, thus, variations thereof are not to be regarded as a departure from the spirit and scope of the invention.

What is claimed is:

1. A method of making a membrane electrode assembly comprising:
   casting onto a nonporous release surface a solvent ink layer comprising a volatile solvent, a catalyst, an electrically conductive particulate material, and an ionomer binder;
   disposing a porous releasable decal over the solvent ink layer;
   drying to remove the volatile solvent from the solvent ink layer to form an electrode layer;
   peeling off the electrode layer and the decal together from the nonporous release surface;
   providing a polymer electrolyte membrane having two sides;
   pressing the electrode layer and the decal together against at least one of the sides of the membrane with the electrode layer in intimate contact with the membrane, causing the electrode layer to bond securely onto the membrane; and
   removing the releasable decal from the electrode layer.

2. A method of making a membrane electrode assembly as set forth in claim 1, wherein the nonporous release surface comprises at least one of chromium, chromium complexes, silicone, siloxane, fluoropolymers, zinc stearate, talc, waxes, boron nitride, graphite, polyolefins, or any mixtures thereof.

3. A method of making a membrane electrode assembly as set forth in claim 1, wherein the porous releasable decal comprises at least one of an expanded fluoropolymer membrane, a porous polyolefin, a porous polyamide, a porous polymer, a porous metal, or diffusion media.

4. A method of making a membrane electrode assembly as set forth in claim 1, wherein the solvent comprises at least one of alcohols, fluorocarbons, fluoroethers, N,N-dimethylformamide (DMF), dimethyl sulfoxide (DMSO), methylene chloride, chloroform, carbon tetrachloride, 1,1,1-trichloroethane, 1,1,2-trichloroethane, trichloroethylene, tetrachloroethylene or any mixtures thereof.

5. A method of making a membrane electrode assembly as set forth in claim 1, wherein the ionomer binder is soluble or dispersible in a volatile solvent or a solvent mixture.

6. A method of making a membrane electrode assembly as set forth in claim 5, wherein the ionomer binder is a proton conductive resin.

7. A method of making a membrane electrode assembly as set forth in claim 6, wherein the proton conductive resin is a sulfonated fluoropolymer resin.

8. A method of making a membrane electrode assembly as set forth in claim 1, wherein the polymer electrolyte membrane comprises a sulfonated proton conductive fluoropolymer resin.

9. A method of making a membrane electrode assembly as set forth in claim 1, wherein the drying is carried out at an elevated temperature.

10. A method of making a membrane electrode assembly as set forth in claim 1, wherein pressing is carried out at an elevated temperature.

11. A method of making a membrane electrode assembly as set forth in claim 1, wherein the electrically conductive particulate material comprises a carbon having a BET surface area of about 100 to about 2,000 $m^2$/gram.

12. A method of producing a fuel cell comprising providing a membrane electrode assembly produced by a method as set forth in claim 1.

13. A method of making a membrane electrode assembly as set forth in claim 1, wherein the drying forms a gradient of the ionomer binder in the electrode layer such that the concentration of the ionomer binder near the porous releasable decal is lower than the concentration of the ionomer binder near the nonporous release surface.

* * * * *